United States Patent
Bayesteh et al.

(10) Patent No.: US 11,638,258 B2
(45) Date of Patent: Apr. 25, 2023

(54) SYSTEMS AND METHODS FOR CONFIGURING SENSING SIGNALS IN A WIRELESS COMMUNICATION NETWORK

(71) Applicants: Alireza Bayesteh, Ottawa (CA); Mohammadhadi Baligh, Ottawa (CA)

(72) Inventors: Alireza Bayesteh, Ottawa (CA); Mohammadhadi Baligh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/564,423

(22) Filed: Sep. 9, 2019

(65) Prior Publication Data

US 2021/0076367 A1    Mar. 11, 2021

(51) Int. Cl.
| | | |
|---|---|---|
| H04W 72/04 | (2009.01) | |
| H04W 4/38 | (2018.01) | |
| H04W 72/0453 | (2023.01) | |
| H04W 72/0446 | (2023.01) | |

(52) U.S. Cl.
CPC ........... *H04W 72/048* (2013.01); *H04W 4/38* (2018.02); *H04W 72/0446* (2013.01); *H04W 72/0453* (2013.01)

(58) Field of Classification Search
CPC ........... H04W 72/048; H04W 72/0046; H04W 72/0453; H04W 72/046; H04W 4/38
USPC ................................. 370/336, 252, 329–330
See application file for complete search history.

(56) References Cited

U.S. PATENT DOCUMENTS

| | | | | |
|---|---|---|---|---|
| 2017/0332390 A1* | 11/2017 | Li | ............. | H04W 52/383 |
| 2018/0270799 A1* | 9/2018 | Noh | ............. | H04L 5/0094 |
| 2019/0219688 A1* | 7/2019 | Liu | ............. | G01S 13/89 |
| 2019/0239202 A1 | 8/2019 | Bhattad et al. | | |
| 2019/0391247 A1* | 12/2019 | Gulati | ............. | G01S 13/284 |
| 2020/0033124 A1* | 1/2020 | Lee | ............. | G01S 13/931 |
| 2020/0072963 A1* | 3/2020 | Yu | ............. | G01S 13/931 |
| 2020/0260440 A1* | 8/2020 | Yasukawa | ............. | H04W 4/46 |

(Continued)

FOREIGN PATENT DOCUMENTS

| | | |
|---|---|---|
| CN | 103415069 A | 11/2013 |
| CN | 107817494 A | 3/2018 |
| CN | 109168174 A | 1/2019 |
| WO | 2021028056 A1 | 2/2021 |

OTHER PUBLICATIONS

Knill, Christina, et al., "High Range and Doppler Resolution by Application of Compressed Sensing Using Low Baseband Bandwidth OFDM Radar", IEEE Transactions on Microwave Theory and Techniques, Jul. 2018, pp. 3535-3546, vol. 66, No. 7.

(Continued)

*Primary Examiner* — Candal Elpenord

(57) ABSTRACT

Systems and methods for the generation of sensing signals and sensing signal configurations for a wireless communication network are provided. In an embodiment, a sensing node identifier (ID) associated with a network entity is determined. This sensing node ID is used to determine a sensing signal configuration, which includes a resource configuration and a symbol sequence. The resource configuration is selected from a set of physical resources associated with a wireless communication network. The symbol sequence is based on the sensing node ID and is specific to the network entity in the wireless communication network. A sensing signal can be transmitted according to the sensing signal configuration.

34 Claims, 9 Drawing Sheets

(56) References Cited

U.S. PATENT DOCUMENTS

2021/0168861 A1* 6/2021 Lee ................ H04W 72/02
2021/0329597 A1* 10/2021 Kwak ............... H04W 4/40

OTHER PUBLICATIONS

Braun, Martin, et al., "Maximum likelihood speed and distance estimation for OFDM radar". Proc. 2010 IEEE Radar Conf., Washington, DC, May 2010, pp. 256-261.

Braun, Martin, et al., "Parameterization of joint OFDM-based radar and communication systems for vehicular Applications". Proc. 20th IEEE Int. Symp. Personal, Indoor, Mobile Radio Communications, Tokyo, Japan, Sep. 2009, pp. 3020-3024.

Donnet, B.J., and Longstaff, I.D. "Combining MIMO radar with OFDM communications". Proc. Third European Radar Conf., Manchester U.K., Sep. 2006, pp. 37-40.

Yang, Yang and Blum, Rick S., "MIMO radar waveform design based on mutual information and minimum mean-square error estimation", IEEE Transactions on Aerospace and Electronic Systems, Jan. 2007, pp. 330-343, vol. 43, No. 1.

Sturm, Christian and Wiesbeck, Werner, "Waveform Design and Signal Processing Aspects for Fusion of Wireless Communications and Radar Sensing", Proceedings of the IEEE, Jul. 2011, pp. 1236-1259, vol. 99, No. 7.

Nokia, Nokia Shanghai Bell, On Cross-link interference measurement framework, 3GPP TSG RAN WG1 NR Ad-hoc #3, Nagoya, Japan, Sep. 18-21, 2017, R1-1715747, 6 pages.

* cited by examiner

SYSTEMS AND METHODS FOR CONFIGURING SENSING SIGNALS IN A WIRELESS COMMUNICATION NETWORK

TECHNICAL FIELD

The present disclosure relates generally to wireless communications, and in particular embodiments, to configuring signals in a wireless communication network.

BACKGROUND

In some wireless communication networks, user equipments (UEs) wirelessly communicate with a base station to send data to the base station and/or to receive data from the base station. A wireless communication from a UE to a base station is referred to as an uplink (UL) communication, and a wireless communication from a base station to a UE is referred to as a downlink (DL) communication. A wireless communication from a first UE to a second UE is referred to as a sidelink (SL) communication or a device-to-device (D2D) communication.

Wireless communications can potentially be improved when properties of a wireless communication network and its surrounding environment are known.

SUMMARY

Sensing signals can be used to determine properties of a wireless communication network and its surrounding environment. Such properties could include the location and/or velocity of UEs, and the location and/or velocity of scattering objects that obstruct communication signals. Communication signals can then be configured based on these properties. There exists a need for sensing signal configurations that enable the coexistence of sensing signals and communication signals in a wireless communication network.

According to one aspect of the present disclosure, there is provided a method for a network entity in a wireless communication network. The method includes determining a sensing node identifier (ID) associated with the network entity, determining a sensing signal configuration, and transmitting a sensing signal according to the sensing signal configuration. The sensing signal configuration includes a resource configuration that is selected from a set of physical resources associated with the wireless communication network, and a symbol sequence that is based on the sensing node ID and is specific to the network entity in the wireless communication network.

In some embodiments, the method further includes determining properties of an object based on a reflection of the sensing signal.

In some embodiments, the method further includes receiving the reflection of the sensing signal.

In some embodiments, the method further includes receiving, from another network entity in the wireless communication network, information pertaining to the reflection of the sensing signal, where determining the properties of the object is based on the information pertaining to the reflection of the sensing signal.

In some embodiments, the object includes at least one of a user equipment (UE) and a scattering object that at least partially obstructs communication signals.

In some embodiments, the method further includes transmitting a communication signal including data, the communication signal being configured based on the properties of the object.

In some embodiments, the method further includes transmitting, using at least some of the set of physical resources, a communication signal including data.

In some embodiments, the sensing signal has a same frame structure and a same numerology as the communication signal.

In some embodiments, the sensing signal has a different frame structure than the communication signal and a same numerology as the communication signal.

In some embodiments, the sensing signal has a different frame structure and a different numerology than the communication signal.

In some embodiments, the set of physical resources is a first set of physical resources, and the method further includes transmitting, using at least some of a second set of physical resources associated with the wireless communication network, a communication signal including data, the second set of physical resources being different from the first set of physical resources.

In some embodiments, the sensing signal is an orthogonal frequency division multiplexing (OFDM) signal.

In some embodiments, the symbol sequence includes a Zadoff-Chu sequence, and determining the sensing signal configuration includes generating the Zadoff-Chu sequence using the sensing node ID as at least one of a root of the Zadoff-Chu sequence and a phase shift value of the Zadoff-Chu sequence.

In some embodiments, the symbol sequence includes a Pseudo Noise (PN) sequence, and determining the sensing signal configuration includes generating the PN sequence using the sensing node ID, the sensing node ID being associated with at least one of a polynomial of the PN sequence, a degree of the PN sequence, and a type of the PN sequence.

In some embodiments, the symbol sequence is further based on a predetermined beam direction for the sensing signal.

In some embodiments, the resource configuration includes a sparsity pattern in at least one of frequency domain and time domain.

In some embodiments, the sparsity pattern is based on at least one of the sensing node ID, a desired sensing accuracy for the sensing signal, a predetermined beam direction for the sensing signal, and a desired peak-to-average power ratio for the sensing signal.

In some embodiments, the sensing signal configuration further includes a beam sweeping pattern associated with the sensing node ID, and the method further includes transmitting a plurality of sensing signals, including the sensing signal, according to the beam sweeping pattern.

In some embodiments, transmitting the plurality of sensing signals includes performing analog beamforming, digital beamforming or hybrid beamforming.

In some embodiments, the method further includes transmitting, to another network entity in the wireless communication network, at least a portion of the sensing signal configuration.

In some embodiments, the network entity is a user equipment, a base station, or a sensing agent.

According to another aspect of the present disclosure, there is provided a network entity in a wireless communication network. The network entity includes a processor to determine a sensing node identifier (ID) associated with the network entity, and to determine a sensing signal configuration. The sensing signal configuration includes a resource configuration that is selected from a set of physical resources associated with the wireless communication network, and a symbol sequence that is based on the sensing node ID and is specific to the network entity in the wireless communication network. The network entity further includes a transmitter to transmit a sensing signal according to the sensing signal configuration.

In some embodiments, the transmitter includes a plurality of transmit antennas, and the sensing signal configuration further includes a mapping to at least some of the plurality of transmit antennas.

According to yet another aspect of the present disclosure, there is provided a method for a first network entity in a wireless communication network. The method includes: determining a sensing signal configuration for a second network entity in the wireless communication network, the sensing signal configuration including a resource configuration that is selected from a set of physical resources associated with the wireless communication network; determining, based on the sensing signal configuration, a signal configuration that at least partially avoids interference with a sensing signal transmitted according to the sensing signal configuration by the second network entity; and transmitting a signal according to the signal configuration.

In some embodiments, the sensing signal configuration further includes a symbol sequence that is based on a sensing node identifier (ID) of the second network entity and is specific to the second network entity in the wireless communication network.

In some embodiments, the signal is a communication signal including data, or another sensing signal.

In some embodiments, determining the sensing signal configuration includes receiving, from the second network entity, an indication of at least a portion of the sensing signal configuration.

In some embodiments, determining the sensing signal configuration includes calculating at least a portion of the sensing signal configuration based on a sensing node identifier (ID) of the second network entity.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
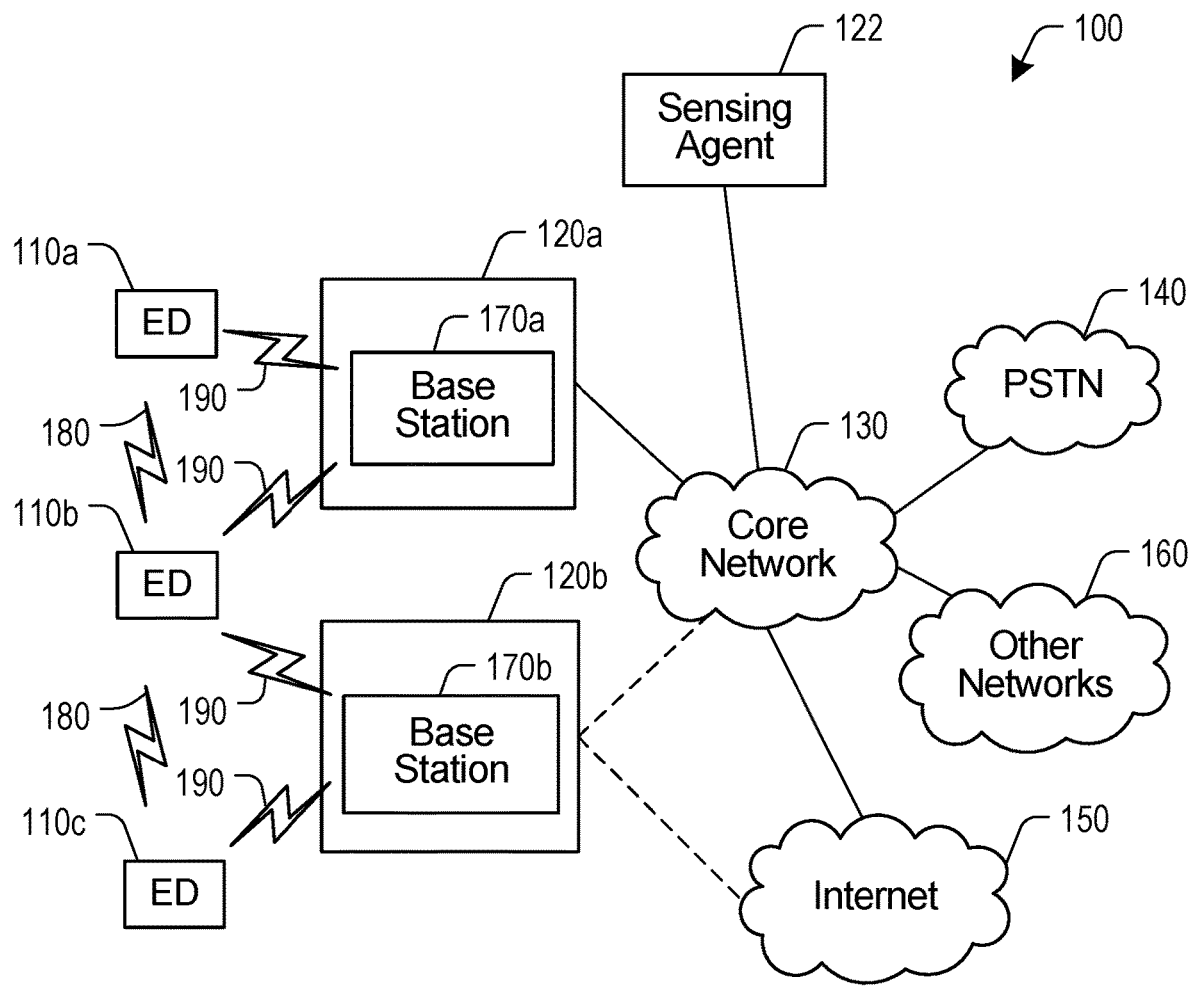
FIG. 1 is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Some aspects of the present disclosure relate to sensing in a wireless communication network, which allows the network to determine information regarding the surrounding environment. For example, sensing could determine the location and/or velocity of one or more objects in the environment. These objects could include network entities that communicate within the network and scattering objects that can potentially disrupt communications in the network. A benefit of sensing is that the network can configure communication signals between network entities based on measured properties of the current environment.

By way of example, when the location of a transmitter, an intended receiver, and any potential scattering objects are known to the network, the network can determine a trajectory from the transmitter to the intended receiver that avoids the scattering objects. Based on this trajectory, the network can configure a suitable communication signal for transmission to the receiver. Beamforming is one method that can be used to direct signals along a particular trajectory. When the trajectory to the intended receiver has been determined with a relatively high precision, narrow beamforming can be implemented for communication with that receiver. Narrow beamforming can increase the received power at the receiver, and reduce interference for other receivers in the network. Having knowledge of the velocity of the intended receiver can also allow the network to predict the future location of the intended receiver and configure future communication signals to that receiver accordingly.

One method for sensing is radar. Radar has been previously used in military applications and in the car industry, often with the goal of detecting the range, velocity and/or shape of certain objects. Conventionally, radar has been implemented as stand-alone application.

After a radar signal is transmitted, a reflection of that radar signal off of an object can be received and measured. These reflections can indicate certain properties of the object, non-limiting examples of which include the range, location, shape, speed and velocity of the object. The range of the object (for example, the distance from the receiver of the radar signal to the object) can be determined based on the time-of-flight for the radar signal, and/or using frequency modulation. The location of the object can be determined based on the range of the object and the direction that the radar signal was transmitted and/or received. For example, beamforming can be used to transmit radar signals in particular directions. The velocity and/or speed of an object can be determined based on a change in the objects position over time, and/or based on the Doppler shift of the received radar signal.

Radar systems can be monostatic and/or bistatic. In monostatic radar, the transmitter of a radar signal is also used to receive the reflection of the radar signal. In bistatic radar, the transmitter of a radar signal is different from the receiver of the reflection of the radar signal.

There are fundamental bounds on range resolution and velocity resolution for a radar signal, which depend on the transmission time ($T_w$), bandwidth (BW) and carrier frequency ($f_c$) of the radar signal. These fundamental bounds exist regardless of the waveform and transmission scheme of the radar signal. The equations for range resolution ($\Delta R$) and velocity resolution ($\Delta v$) are provided below:

$$\Delta R \geq \frac{c_0}{2BW} \quad \text{(Equation 1)}$$

$$\Delta v \geq \frac{c_0}{2T_w f_c} \quad \text{(Equation 2)}$$

In equation 1 and equation 2 above, $c_0$ denotes the speed of light. Based on these equations, to improve range resolution a larger bandwidth is needed, and to improve velocity resolution a larger transmission time and/or a higher carrier frequency is needed.

Sensing agents are nodes in a network that can assist in the sensing operation. These nodes can be stand-alone nodes dedicated to just sensing operations or other nodes (for example transmit and receive points (TRPs) or user equipments (UEs)) doing the sensing operations in parallel with communication transmissions. In cases where the sensing agents are implemented as stand-alone nodes, the sensing can be implemented in the vicinity of some corresponding TRPs to ensure that the distance between the TRP and a target is approximately the same as the distance between the sensing agent and the target to simplify range estimation. Another condition than needs consideration is that the sensing agent and the TRP are synchronized in time and frequency (for example, by accessing the same clock for time synchronization).

Some aspects of the present disclosure relate to the integration of sensing and wireless communications. For example, wireless communication networks could configure and implement both sensing signals and communication signals. Sensing signals, which could also be referred to as sensing reference signals, are used to determine properties of the environment, and do not carry any information or data for the purpose of communications. Communication signals, on the other hand, are signals that carry information or data between network entities. A possible benefit of implementing both sensing and communications operations is that the network can configure communication signals based on the information determined from sensing. This is referred to as sensing-assisted communications. For example, sensing could determine the location of an intended receiver and enable narrow beamforming to that receiver. Communication-assisted sensing is also contemplated. Sensing signals and communication signals could be implemented using the same hardware and/or the same waveform in order to operate in an integrated fashion.

Configurations and designs of sensing signals from the point of view of a radio access node (RAN) are contemplated. A challenge to configuring sensing signals in a wireless communication network is achieving the coexistence of sensing signals and communication signals. Sensing signals should be configured such that a sensing operation performed by one network entity does not significantly degrade the communications performance or the sensing performance of other network entities. By way of example, interference between sensing signals and communication signals should be limited.

FIGS. 1, 2A, 2B and 2C illustrate examples of networks and devices that could implement any or all aspects of the present disclosure.

FIG. 1 illustrates an example communication system 100. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a sensing agent 122, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

Any or all of the EDs 110a-110c and base stations 170a-170b could be sensing nodes in the system 100. Sensing nodes are network entities that perform sensing by transmitting and/or receiving sensing signals. Some sensing nodes are communication equipment that perform both communications and sensing. However, some sensing nodes do not perform communications, and are instead dedicated to sensing. The sensing agent 122 is an example of a sensing node that is dedicated to sensing. Unlike the EDs 110a-110c and base stations 170a-170b, the sensing agent 122 does not transmit or receive communication signals. However, this does not exclude the sensing agent 122 from communicating configuration information, sensing information, or other information within the communication system 100. The sensing agent 122 is in communication with the core network 130 to communicate information with the rest of the communication system 100. By way of example, the sensing agent 122 may determine the location of the ED 110a, and transmit this information to the base station 170a via the core network 130. Although only one sensing agent 122 is shown in FIG. 1, any number of sensing agents may be implemented in the communication system 100. In some embodiments, one or more sensing agents could be implemented at the RANs 120a-120b.

The EDs 110a-110c, base stations 170a-170b and sensing agent 122 are examples of network entities that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple non-collocated transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190. In addition, the communication system 100 may operate in time division duplex (TDD) and/or frequency division duplex (FDD) modes.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum. In addition, the SL air interfaces 180 may operate in time division duplex (TDD) and/or frequency division duplex (FDD) modes.

Some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

The base stations 170a-170b, the EDs 110a-110c, and the sensing agent 122 can perform or aid in sensing by transmitting and/or receiving sensing signals (not shown). The sensing signals can be used to determine properties of the communication system 100 and its surrounding environment. For exampling, sensing signals could be used to determine the location and/or velocity of the EDs 110a-110c. Similar to the air interfaces 190 and/or the SL air interfaces 180, the sensing signals could utilize any suitable radio access technology. In some embodiments, sensing signals occupy the millimeter band (also referred to as the extremely high frequency band). Possible advantages of millimeter band include a relatively large amount of bandwidth available for sensing and a stronger reflection of the sensing signals from objects, as some materials reflect millimeter waves more strongly than other radio bands.

Figure 2A:
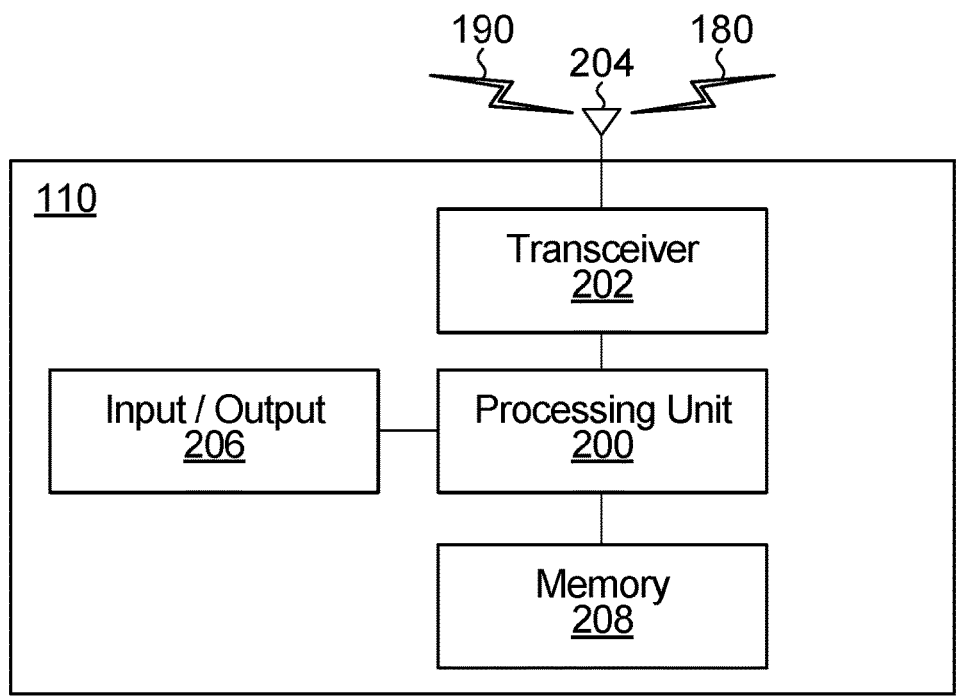
FIGS. 2A, 2B and 2C are block diagrams of an example user equipment, base station and sensing agent, respectively, according to aspects of the present disclosure.
Figure 2B:
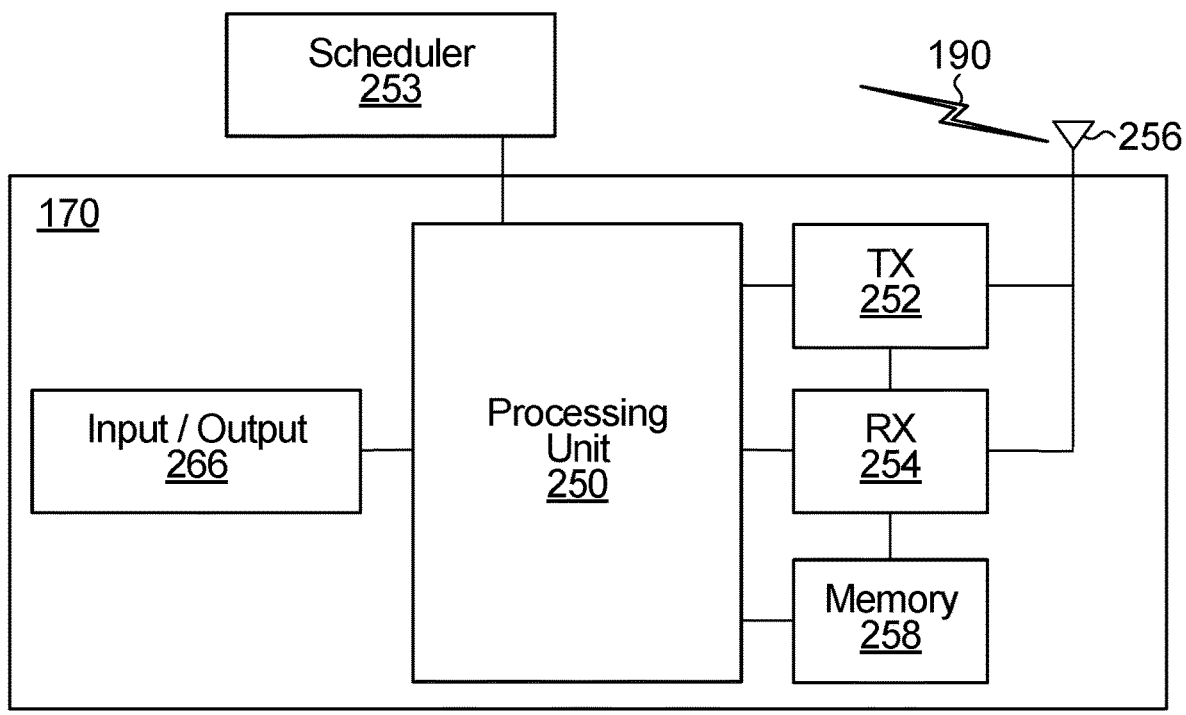
Figure 2C:
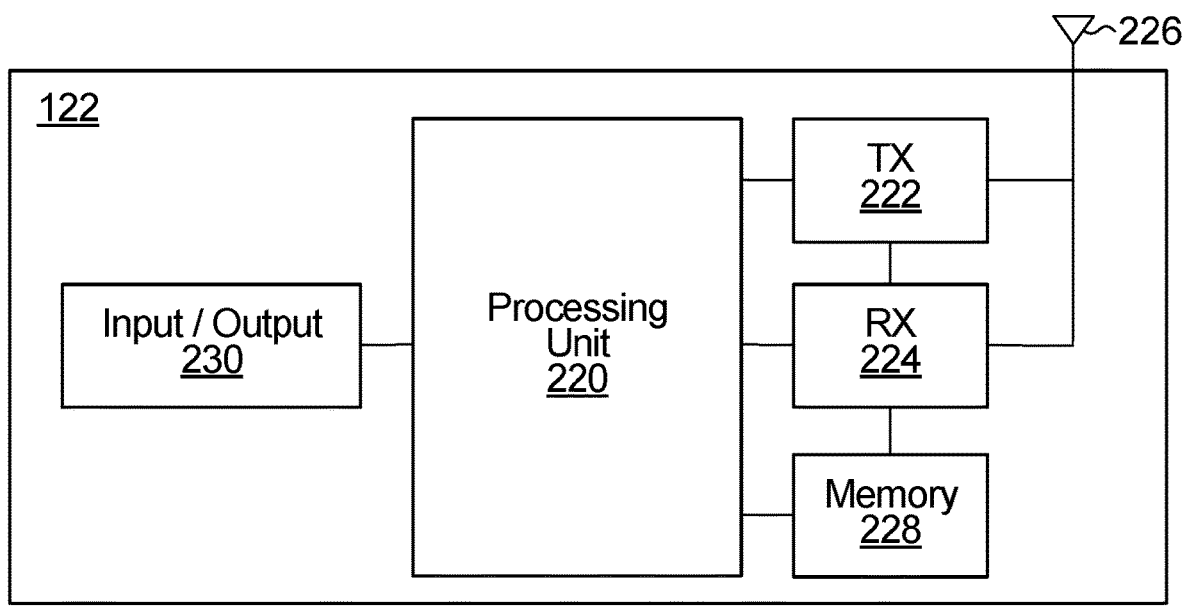

FIGS. 2A, 2B and 2C illustrate example devices that may implement the methods and teachings according to this disclosure. In particular, FIG. 2A illustrates an example ED 110, FIG. 2B illustrates an example base station 170, and FIG. 2C illustrates an example sensing agent 122. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, bit scrambling, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described elsewhere herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, bit scrambling, data processing, power control, input/output processing, or any other functionality. The processing unit 250 can also be configured to implement some or all of the functionality and/or embodiments described in more detail elsewhere herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described elsewhere herein and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

As shown in FIG. 2C, the sensing agent 122 includes at least one processing unit 220, at least one transmitter 222, at least one receiver 224, one or more antennas 226, at least one memory 228, and one or more input/output devices or interfaces 230. A transceiver, not shown, may be used instead of the transmitter 222 and receiver 224. The processing unit 220 implements various processing operations of the sensing agent 122, such as signal coding, bit scrambling, data processing, power control, input/output processing, or any other functionality. The processing unit 220 can also be configured to implement some or all of the functionality and/or embodiments described in more detail elsewhere herein. Each processing unit 220 includes any suitable processing or computing device configured to perform one or more operations. Each processing unit 220 could, for example, include a microprocessor, microcontroller, digital signal processor, field programmable gate array, or application specific integrated circuit.

Each transmitter 222 includes any suitable structure for generating sensing signals for wireless transmission. Each receiver 224 includes any suitable structure for processing sensing signals received wirelessly. Although shown as separate components, at least one transmitter 222 and at least one receiver 224 could be combined into a transceiver. In some embodiments, a sensing agent may only transmit or receive sensing signals. This may be the case in bistatic sensing, for example. In some embodiments, a sensing agent only transmits sensing signals, and the reflections of these sensing signals could be received by other sensing nodes. In some embodiments, a sensing agent receives reflections of sensing signals, but does not transmit sensing signals. Therefore, some sensing agents might only include one of a transmitter and a receiver. For the sensing agent 122, the at least one transmitter 222 or the at least one receiver 224 could be optional.

Each antenna 226 includes any suitable structure for transmitting and/or receiving wired or wireless signals. Although a common antenna 226 is shown here as being coupled to both the transmitter 222 and the receiver 224, one or more antennas 226 could be coupled to the transmitter(s) 222, and one or more separate antennas 226 could be coupled to the receiver(s) 224. Each memory 228 includes any suitable volatile and/or non-volatile storage and retrieval device(s) such as those described above in connection to the ED 110. The memory 228 stores instructions and data used, generated, or collected by the sensing agent 122. For example, the memory 228 could store software instructions or modules configured to implement some or all of the functionality and/or embodiments described elsewhere herein and that are executed by the processing unit(s) 220. Each input/output device 230 permits interaction with a user or other devices in the network.

Figure 3A:
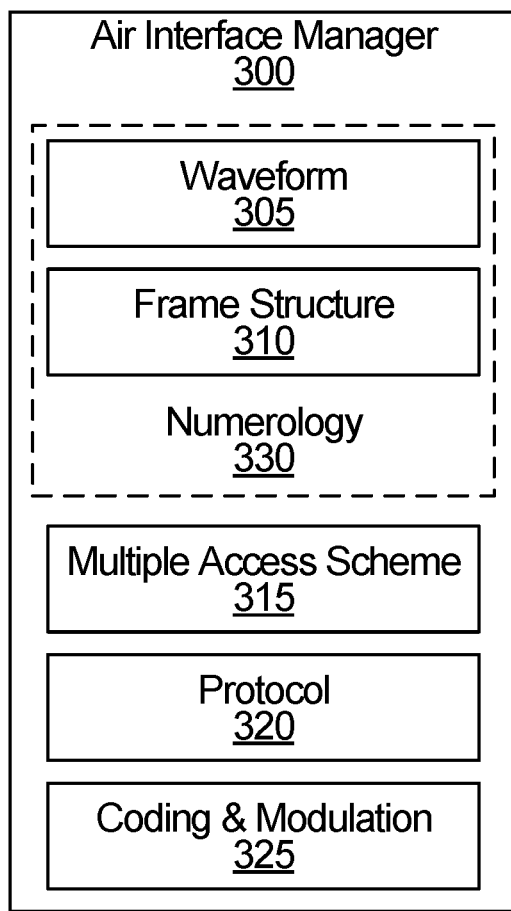
FIG. 3A is a block diagram of an air interface manager for configuring a software-configurable air interface according to an aspect of the present disclosure.

FIG. 3A illustrates a schematic diagram of an air interface manager 300 for configuring a software-configurable air interface 190. Air interface manager 300 may be, for example, a module comprising a number of components or building blocks that define the parameters of the air interface 190 and collectively specify how a transmission is to be made and/or received by the air interface 190. The air interface manager 300 could also or instead define the parameters of sensing signals in the communication system 100.

The components of the air interface manger 300 include at least one of a waveform component 305, a frame structure component 310, a multiple access scheme component 315, a protocol component 320, and a coding and modulation component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF). In some embodiments, a combination of waveform options is possible. A LFM-OFDM waveform is a non-limiting example of such a combination.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication or a frequency-division duplex communication.

Figure 3B:
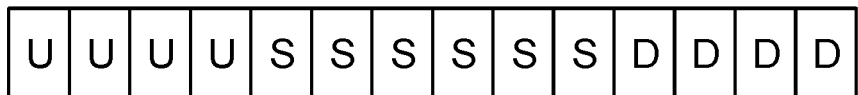
FIGS. 3B and 3C are diagrams illustrating example transmission frames according to aspects of the present disclosure.
Figure 3C:

Additionally, the frame structure component 310 may further specify the transmission state and/or direction for each symbol in a frame. For example, each symbol may independently be configured as a downlink symbol, an uplink symbol, a flexible symbol or a sensing symbol. A sensing signal may be transmitted or received in a sensing symbol. An example is shown in FIG. 3B, which illustrates a transmission frame 350 including uplink (U), sensing (S) and downlink (D) symbols. Note that the sensing symbols can be configured to have a different numerology than the uplink and/or downlink symbols. For example, the sensing symbols can be configured to have a shorter length than the uplink/downlink symbols. This is shown in FIG. 3C, which illustrates a transmission frame 360 including uplink (U), sensing (S) and downlink (D) symbols. The sensing symbols in the transmission frame 360 are configured to have a shorter length than the sensing symbols in the transmission frame 350.

Together, the specifications of the waveform component and the frame structure component are sometimes known as the "numerology." Thus, the air interface 190 may include a numerology component 330 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing maybe compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access, non-orthogonal multiple access, orthogonal multiple access, e.g., via a dedicated channel resource (i.e., no sharing between multiple EDs), contention-based shared channel resource, non-contention-based shared channel resource, and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The coding and modulation component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g. 16 QAM, 64 QAM, etc.), or more specifically to various types of advanced modulation methods such as hierarchical modulation, multi-dimensional modulation and low Peak-to-Average Power Ratio (PAPR) modulation.

Because an air interface comprises a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the coding and modulation component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

Figure 4:
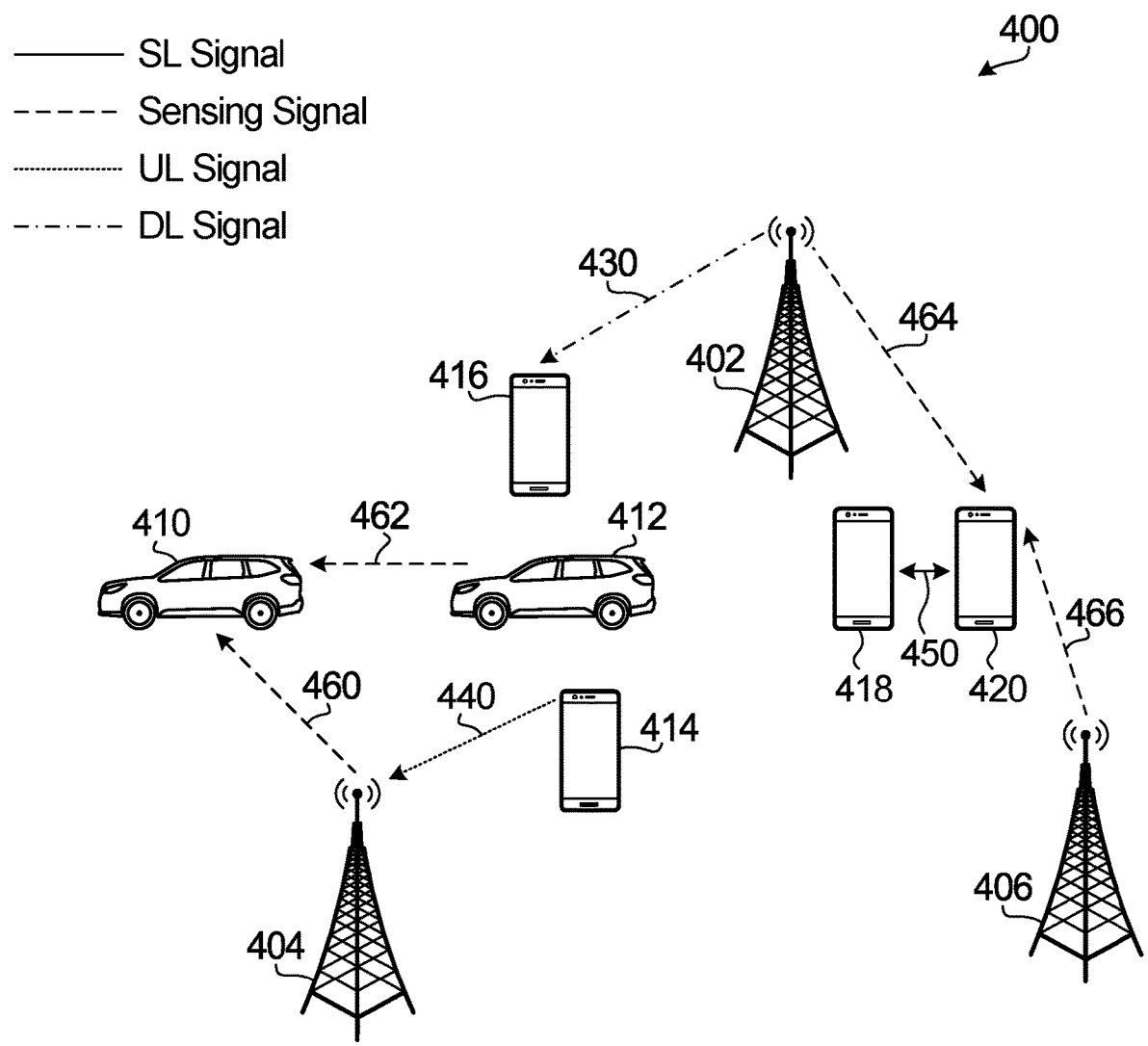
FIG. 4 is a diagram illustrating an example communication system implementing sensing according to aspects of the present disclosure.

FIG. 4 is a diagram illustrating an example communication system 400 implementing sensing. The communication system 400 includes multiple transmission and receive points (TRPs) 402, 404, 406, and multiple UEs 410, 412, 414, 416, 418, 420. The UEs 410, 412 are illustrated as vehicles and the UEs 414, 416, 418, 420 are illustrated as cell phones, however this is only an example.

The TRP 402 is a base station that transmits a downlink (DL) signal 430 to the UE 416. The DL signal 430 is an example of a communication signal carrying data. The TRP 402 also transmits a sensing signal 464 in the direction of the UEs 418, 420. Therefore, the TRP 402 is involved in sensing and is considered to be a sensing node.

The TRP 404 is a base station that receives an uplink (UL) signal 440 from the UE 414, and transmits a sensing signal 460 in the direction of the UE 410. The UL signal 440 is an example of a communication signal carrying data. Since the TRP 404 is involved in sensing, this TRP is considered to be a sensing node as well as a communication node.

The TRP 406 transmits a sensing signal 466 in the direction of the UE 420, and therefore this TRP is considered to be a sensing node. The TRP 406 may or may not transmit or receive communication signals in the communications system 400. In some embodiments, the TRP 406 could be replaced with a sensing agent (SA) that is dedicated to sensing, and does not transmit or receive any communication signals in the communication system 400.

The UEs 410, 412, 414, 416, 418, 420 are all capable of transmitting and receiving communication signals on UL, DL and/or SL. For example, the UEs 418, 420 are communicating with each other via SL signals 450. At least some of the UEs 410, 412, 414, 416, 418, 420 are also sensing nodes in the communication system 400. By way of example, the UE 412 transmits a sensing signal 462 in the direction of the UE 410, and therefore the UE 412 is considered to be a sensing node.

The sensing nodes in the communication system 400 could implement monostatic and/or bistatic sensing. In the case of monostatic sensing, the transmitter of a sensing signal also receives a reflection of the sensing signal to determine the properties of one or more objects. In one example, the TRP 404 could receive a reflection of the sensing signal 460 from the UE 410 and potentially determine properties of the UE 410 based on the reflection of the sensing signal. In another example, the UE 412 could receive a reflection of the sensing signal 462 and potentially determine properties of the UE 410.

In the case of bistatic sensing, the receiver of a reflected sensing signal is different from the transmitter of the sensing signal. Any or all of the UEs 410, 412, 414, 416, 418, 420 could be involved in sensing by receiving reflections of the sensing signals 460, 462, 464, 466. Similarly, any or all of the TRPs 402, 404, 406 could receive reflections of the sensing signals 460, 462, 464, 466.

In one example, the sensing signal 464 could be reflected off of the UE 420 and be received by the TRP 406. It should be noted that a sensing signal might not physically reflect off of a UE, but could instead reflect off an object that is associated with the UE. For example, the sensing signal 464 could reflect off of a user or vehicle that is carrying the UE 420. The TRP 406 could determine certain properties of the UE 420 based on a reflection of the sensing signal 464, including the range, location, shape, speed and/or velocity of the UE 420, for example. In some implementations, the TRP 406 transmits information pertaining to the reflection of the sensing signal 464 to the TRP 402, and/or to any other network entity. The information pertaining to the reflection of the sensing signal 464 could include the time that the reflection was received, the time-of-flight of the sensing signal (for example, if the TRP 406 knows when the sensing signal was transmitted), the carrier frequency of the reflected sensing signal, the angle of arrival of the reflected sensing signal, and/or the Doppler shift of the sensing signal (for example, if the TRP 406 knows the original carrier frequency of the sensing signal). Other types of information pertaining to the reflection of a sensing signal are also contemplated.

The TRP 402 could determine properties of the UE 420 based on the received information pertaining to the reflection of the sensing signal 464. If the TRP 406 has determined certain properties of the UE 420 based on the reflection of the sensing signal 464, such as the location of the UE 420, then the information pertaining to the reflection of the sensing signal 464 could also or instead include these properties.

In another example, the sensing signal 462 could be reflected off of the UE 410 and be received by the TRP 404. Similar to the example provided above, the TRP 404 could determine properties of the UE 410 based on the reflection of the sensing signal, and/or transmit information pertaining to the reflection of the sensing signal to another network entity, such as the UEs 410, 412.

In a further example, the sensing signal 466 could be reflected off of the UE 420 and be received by the UE 418. The UE 418 could determine properties of the UE 420 based on the reflection of the sensing signal, and/or transmit information pertaining to the reflection of the sensing signal to another network entity, such as the UE 420 and/or the TRPs 402, 406.

The sensing signals 460, 462, 464, 466 are transmitted along particular directions, and in general, a sensing node could transmit multiple sensing signals in multiple different directions. In some implementations, sensing signals are intended to sense the environment over a given area, and beam sweeping is one method to achieve this. Beam sweeping can be performed using analog beamforming to form a beam along a desired direction using phase shifters, for example. Digital beamforming and hybrid beamforming are also possible. During beam sweeping, a sensing node could transmit multiple sensing signals according to a beam sweeping pattern, where each sensing signal is beamformed in a particular direction.

The UEs 410, 412, 414, 416, 418, 420 are examples of objects in the communication system 400, any or all of which could be detected and measured using sensing signals. However, other types of objects could also be detected and measured using sensing signals. Although not illustrated in FIG. 4, the environment surrounding the communication system 400 could include one or more scattering objects that reflect sensing signals and potentially obstruct communication signals. For example, trees and/or buildings could at least partially block the path from the TRP 402 to the UE 420, and potentially impede communications between the TRP 402 and the UE 420. The properties of these trees and/or buildings could be determined based on a reflection of the sensing signal 464, for example.

In some embodiments, communication signals are configured based on the determined properties of one or more objects. The configuration of a communication signal could include, but is not limited to, the configuration of a numerology, waveform, frame structure, multiple access scheme, protocol, beamforming direction, coding scheme and/or modulation scheme. Any or all of the communication signals 430, 440, 450 could be configured based on the properties of the UEs 414, 416, 418, 420. In one example, the location and velocity of the UE 416 could be used to help determine a suitable configuration for the DL signal 430. The properties of any scattering objects between the UE 416 and the TRP 402 could also be used to help determine a suitable configuration for the DL signal 430. Beamforming could be used to direct the DL signal 430 towards the UE 416 and to avoid any scattering objects. In another example, the location and velocity of the UE 414 could be used to help determine a suitable configuration for the UL signal 440. The properties of any scattering objects between the UE 414 and the TRP 404 could also be used to help determine a suitable configuration for the UL signal 440. Beamforming could be used to direct the UL signal 440 towards the TRP 404 and to avoid any scattering objects. In a further example, the location and velocity of the UEs 418, 420 could be used to help determine a suitable configuration for the SL signals 450. The properties of any scattering objects between the UEs 418, 420 could also be used to help determine a suitable configuration for the SL signals 450. Beamforming could be used to direct the SL signals 450 to either or both of the UEs 418, 420 and to avoid any scattering objects.

The properties of the UEs 410, 412, 414, 416, 418, 420 could also or instead be used for purposes other than communications. For example, the location and velocity of the UEs 410, 412 could be used for the purpose of autonomous driving.

The transmission of sensing signals 460, 462, 464, 466 and communication signals 430, 440, 450 could potentially result in interference in the communication system 400, which can be detrimental to both communication and sensing operations. Some aspects of the present disclosure relate to sensing signal configurations that enable the coexistence of sensing signals and communication signals in a communication network. Such coexistence can be achieved using sensing signal configurations that can at least partially avoid interference with communication signals and/or other sensing signals.

In some embodiments, a sensing node determines a sensing signal configuration or sensing signal configuration information, and then transmits a sensing signal according to the sensing signal configuration. Non-limiting examples of determining a sensing signal configuration include receiving at least a portion of the sensing signal configuration from another network entity, and generating at least a portion of the sensing signal configuration based on one or more predetermined properties.

Sensing signals can be in-band or out-of-band. For in-band sensing, sensing signals and communication signals are transmitted using the same set of physical resources. For example, a network entity could transmit communication signals and sensing signals over the same frequency band simultaneously or at different times. For out-of-band sensing, sensing signals are transmitted using a set of physical resources that is different from the set of physical resources used for communication signals. In some embodiments, the set of physical resources is dedicated to sensing.

Sensing signal configurations can be target-specific and/or sensing node-specific. Target-specific means that the sensing signal is configured for a particular target. These targets could include UEs and scattering objects, for example. In some implementations, target-specific sensing signals improve the sensing performance for particular targets. Target-specific parameters could be obtained by a sensing node through measurement, training, and/or based on some desired performance indicator. This desired performance indicator could include, but is not limited to, target classification results (for example, whether the target is low-mobility or high-mobility), and desired sensing quality.

Sensing-node specific means that the sensing signal is configured for a particular sensing node. In some implementations, sensing node-specific sensing signals improve the sensing performance for particular sensing nodes. For example, a sensing node-specific sensing signal configuration can be based on the properties and requirements of the sensing node that will transmit and/or receive the sensing signal. Possible benefits of implementing target-specific and/or sensing node-specific sensing signal configurations include the flexibility to adjust the configuration of a sensing signal based on a desired sensing quality, and/or to reduce interference between sensing signals from different sensing nodes. Target-specific and/or sensing node-specific configurations can be applied to both in-band sensing and out-of-band sensing.

Some sensing node-specific sensing signal configurations are based on, and possibly include, unique identifiers that are specific to the transmitter of the sensing signal. The unique identifiers could allow the transmitter of a sensing signal to be determined by other network entities that receive the sensing signal. For example, in some embodiments, any or all sensing nodes in a network are assigned a respective sensing node identifier (ID). The sensing node ID is an example of a unique identifier that is specific to the transmitter of a sensing signal. Sensing node IDs could be the same as, or at least be associated with, other network IDs such as cell IDs and UE IDs. Alternatively, sensing node IDs could be configured independently. In some implementations, the sensing node ID is at least partially configured and/or assigned by the network, and could be communicated to a sensing node via higher-layer signaling, such as radio resource control (RRC) signaling or medium access control (MAC) control element (CE) signaling, for example. In some implementations, a sensing node determines its sensing node ID based on another network ID assigned to the sensing node. The sensing node could also, or instead, determine the sensing node IDs of other sensing nodes in the network based on their assigned network IDs. Sensing signal configurations for a particular sensing node can be based on, or mapped to, the sensing node ID that is associated with that sensing node.

Parameters that can be included in a sensing signal configuration will now be discussed in detail. However, these parameters are provided by way of example only, and are not intended to be limiting. In general, a sensing signal configuration can include any set of parameters.

In some embodiments, a sensing signal configuration includes a waveform configuration. Depending on the type of waveform used for a sensing signal, several possible parameters may be set in order to improve the performance of the sensing signal in a communication network. For example, a numerology for the sensing signal configuration may be set based on the type of waveform that is configured. Improving the performance of a sensing signal could include, but is not limited to, improving the range resolution and velocity resolution of the sensing signal, and reducing interference with communication signals and/or other sensing signals.

Using a waveform that is compatible with both communications and sensing operations could improve the performance of both operations, and reduce complexity for some sensing nodes. For example, the same receivers could be used for receiving sensing signals and for receiving communication signals. In addition, using a waveform that is compatible with both communications and sensing operations enables joint detection and/or processing of sensing and communication signals to improve the detection of both. Sensing signals and communication signals could also use the same frame structure and/or numerology (for example, subcarrier spacing, cyclic prefix (CP) length, etc.), which could also improve performance and reduce complexity.

Orthogonal frequency division multiplexing (OFDM) waveforms could be used for sensing signals, and can achieve suitable sensing performance in some implementations. Radar sensing using OFDM waveforms has been investigated in the following studies:

Braun, M., Sturm, C., Jondral, F. K. *"Maximum likelihood speed and distance estimation for OFDM radar"*. Proc. 2010 *IEEE Radar Conf.*, Washington, D.C., May 2010, pp. 256-261;

Braun, M., Sturm, C., Niethammer, A., Jondral, F. *"Parameterization of joint OFDM-based radar and communication systems for vehicular Applications"*. Proc. 20th *IEEE Int. Symp. Personal, Indoor, Mobile Radio Communications*, Tokyo, Japan, September 2009, pp. 3020-3024;

Donnet, B. J., Longstaff, I. D. *"Combining MIMO radar with OFDM communications"*. Proc. *Third European Radar Conf.*, Manchester U.K., September 2006, pp. 37-40;

Yang Yang and R. S. Blum, *"MIMO radar waveform design based on mutual information and minimum mean-square error estimation"*, *Aerospace and Electronic Systems, IEEE Transactions* on, vol. 43, no. 1, pp. 330-343, January 2007; and C. Sturm and W. Wiesbeck, *"Waveform Design and Signal Processing Aspects for Fusion of Wireless Communications and Radar Sensing"*, *Proceedings of the IEEE*, Volume: 99, Issue: 7, July 2011, pp. 1236-1259.

OFDM may be a suitable choice of waveform for in-band sensing and/or out-of-band sensing. In some embodiments, OFDM waveforms are used for communication signals and for sensing signals to allow for the joint detection and processing of sensing signals and communication signals. The numerologies of the OFDM waveforms for the communication signals and sensing signals could be the same or different.

In some embodiments, the numerology of an OFDM waveform could be selected to improve sensing performance and reduce interference between different sensing signals. Considering a sensing signal configuration with a cyclic prefix OFDM (CP-OFDM) waveform as an example, subcarrier spacing, CP length/overhead, and sensing slot length (for example, the number of symbols included in each sensing cycle as well as the configuration of sensing symbols in the sensing cycle, e.g. contiguous symbols or distributed symbols) are parameters that may be set to possibly improve the performance of the sensing signal.

It should be noted that the present disclosure is not limited to any particular types or configurations of waveforms for sensing signals or communication signals. For example, a waveform configuration for a sensing signal could be single-carrier (where spreading sequences could be used for interference mitigation), multi-carrier, ultra-wide band, or frequency modulated continuous wave. In some embodiments, a waveform configuration can be target-specific and/or sensing node-specific.

In some embodiments, a sensing signal configuration includes a symbol sequence. As a sensing signal does not carry any data, the symbol sequence could be configured to distinguish sensing signals sent by different sensing nodes and/or to mitigate interference. In some embodiments, a symbol sequence for a sensing signal configuration is sensing node-specific and is based on a sensing node ID for that sensing node. A symbol sequence for a sensing signal configuration could also or instead be target-specific.

In some embodiments, the symbol sequence could be configured to optimize the sensing performance. For example, sequences with good autocorrelation properties can be used to achieve improved range resolution.

In some embodiments, sensing signals are configured to reduce cross-correlation between different symbol sequences sent on the same resources. As the length of a symbol sequence increases, the number of degrees of freedom for the symbol sequence and the potential number of orthogonal symbol sequences become larger. A set or pool of potential symbol sequences may be generated for sensing signals in the network. Once the symbol sequence pool is generated, a symbol sequence for a particular sensing signal configuration can be generated or configured using a seed that is mapped to the sensing node ID of the associated sensing node. For example, if the symbol sequence is a Zadoff-Chu (ZC) sequence, the seed value can be the root or phase shift value of the ZC sequence. In another example, if the symbol sequence is a binary Pseudo Noise (PN) sequence, the seed value can be associated with the generating polynomial and/or the degree for a given sequence type.

In some embodiments, a symbol sequence for a sensing signal is based on, and possibly specific to, a predetermined beam direction for that sensing signal. As such, different symbol sequences can be used for different beam directions. A sensing node could perform beam sweeping to cover a given area, and each of the sensing signals transmitted by the sensing node during beam sweeping can be dependent on the beam direction. In some embodiments, certain directions that are more predictable may need less accurate sensing (for example, there are fixed objects in these directions and less change in the environment), and therefore shorter symbol sequences could be implemented. Other directions may be less predictable, and therefore longer symbol sequences could be used for these directions.

The set of sensing signal configurations that are used during beam sweeping, which may be referred to as a sensing map, can be linked to a common seed based on a sensing node ID. The sensing map can be pre-configured by the network so that it is known to some or all sensing nodes in the network for improved interference mitigation. Each sensing node can update its sensing map based on feedback from the sensing signals (for example, a change in the predictability of certain beam directions), and can communicate the updated sensing map to the network. For example, the updated sensing map can be communicated to the network through radio resource control (RRC) signaling, L1 signaling or X2/Xn signaling. Sensing map updates can occur semi-statically so that overhead for the network is reduced. In some embodiments, a general symbol sequence that gives the required length is configured (for example, a ZC sequence), and sensing node IDs are input to return the final sequence.

Depending on the power capability of a sensing node, and/or the waveform used, relatively low peak-to-average power ratios (PAPRs) for sensing signals may be desired. Therefore, in some embodiments, symbol sequences are configured for a relatively low PAPR. Low PAPR sequences could include ZC sequences, similar to those that have been used in demodulation reference signal (DMRS) designs. Low PAPR sequences could also or instead be found by a computer search. Low PAPR sequences that are used in conjunction with appropriate resource mapping can result in low PAPR sensing signal transmission.

A symbol sequence for a sensing signal configuration could depend on whether the sensing signal is in-band or out-of-band. There may be more flexibly in the configuration of symbol sequences in out-of-band, whereas in in-band the sensing signals are multiplexed with data, and the configuration of symbol sequences may be more limited. In some embodiments, the configuration of sensing signal symbol sequences is based on techniques used for configuring other types of reference signals including channel state information reference signals (CSI-RSs), DMRSs, and positioning reference signals (PRSs), for example.

In some embodiments, a sensing signal configuration includes a resource configuration, a resource allocation or a resource mapping configuration. A resource configuration for a sensing signal is selected from a set of physical resources associated with the wireless communication network. As noted above, for in-band sensing these physical resources are also used for the transmission of communication signals, and for out-of-band sensing these physical resources are different from the resources used for communication signals.

Physical resources for sensing signals can be configured in a sparse way. For example, a resource configuration could include a sparsity pattern in at least one of the frequency domain and the time domain. This sparsity pattern could be similar to those used for channel estimation, for example. In some implementations, the sparsity pattern could result in negligible performance loss compared to a full pattern. Potential benefits of sparsity patterns include allowing for multiplexing of sensing signals and communication signals, efficient detection of multiple sensing signals simultaneously, and more efficient joint detection of sensing signals and communication signals. In some implementations, the configuration of a sparsity pattern for a sensing signal is similar to the configuration of a sparsity pattern in non-orthogonal multiple-access (NoMA). Further details regarding the performance of sparsity patterns for sensing signals can be found in C. Knill, B. Schweizer, S. Sparrer, F. Roos, Robert F. H. Fischer, and C. Waldschmidt, "*High Range and Doppler Resolution by Application of Compressed Sensing Using Low Baseband Bandwidth OFDM Radar*", *IEEE TRANSACTIONS ON MICROWAVE THEORY AND TECHNIQUES*, VOL. 66, NO. 7, JULY 2018, pp. 3535-3546.

Figure 5:
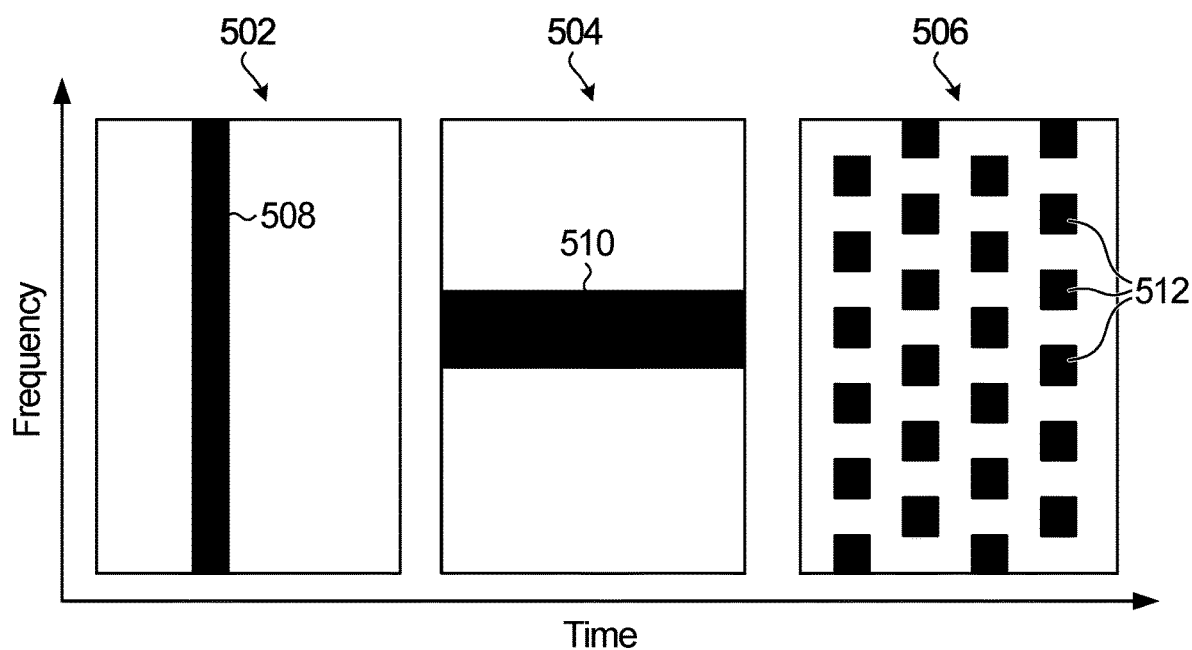
FIG. 5 is a block diagram illustrating multiple example resource configurations with sparsity patterns according to aspects of the present disclosure.

FIG. 5 includes block diagrams illustrating multiple example resource configurations 502, 504, 506 with different sparsity patterns. In the illustrated embodiment, the horizontal axis of each of the resource configurations 502, 504, 506 represents the time domain, and the vertical axis of each of the resource configurations 502, 504, 506 represents the frequency domain. Each of the resource configurations 502, 504, 506 includes respective time-frequency resources 508, 510, 512 that are selected from a set of physical resources. The resources 512 include a pattern of discontinuous resources, but only three of the resources in the pattern are labeled to avoid congestion of the figure.

The resources 508 could be considered to include more resources in the frequency domain (for example, physical resource blocks and/or subcarriers) than resources in the time domain (for example, subframes, slots and/or symbols). Therefore, the resource configuration 502 is sparse in the time domain. The resources 510 could be considered to include more resources in the time domain than resources in the frequency domain, and therefore the resource configuration 502 is sparse in the frequency domain. The resource configuration 506 is sparse in the time domain and the frequency domain, as the resources 512 include an equal-distance pattern in the time domain and the frequency domain.

In some embodiments, a sparsity pattern for a sensing signal resource configuration is based on the sensing node ID of the sensing node that will transmit the sensing signal. In other words, resource configurations and sparsity patterns for sensing signals can be sensing node-specific. These sensing node-specific resource configurations and sparsity patterns could provide improved interference mitigation for different sensing signals. Resource configurations and sparsity patterns that are sensing node-specific can also provide better sensing diversity, since a sensing node receiver can jointly detect multiple sensing signals in a set of physical resources. The sensing node receiver can then obtain sensing information from multiple sensing signals transmitted from multiple sensing nodes.

In some embodiments, a sparsity pattern for a sensing signal resource configuration is based on a desired sensing quality or accuracy for the sensing signal. Sensing accuracy could be sensing node-specific. For example, some sensing nodes could have access to cameras or past sensing data, which could provide environmental information and reduce the desired accuracy of future sensing signals. Sensing nodes with different desired sensing accuracies can have different resource configurations and/or sparsity patterns. If range accuracy is important (for example, for targets that are not moving), then having sparsity in time domain rather than in frequency domain may be preferred, as illustrated by the resource configuration 502 of FIG. 5. If velocity accuracy is more important, then having sparsity in frequency domain may be preferred, as illustrated by the resource configuration 504 of FIG. 5. Desired sensing accuracy could also or instead be target-specific.

In some embodiments, a sparsity pattern for a sensing signal resource configuration is based on a predetermined beam direction for the sensing signal. For example, in the case that a sensing node performs beam sweeping during sensing, the sensing signal resource configurations for the sensing node can depend on each beam direction. Some beam directions could require more accurate range detection, while other beam directions could require more accurate velocity detection. Therefore, the resource configurations and sparsity patterns for these directions may differ.

In some embodiments, a sparsity pattern for a sensing signal resource configuration is based on a desired PAPR for the sensing signal. Resource reconfigurations can be designed to help achieve a low PAPR. For example, equal-distance sparsity patterns in the frequency domain can be implemented for low PAPR sensing signal configurations, as illustrated by the resource configuration 506 of FIG. 5. Low PAPR sparsity patterns that are used in conjunction with low PAPR sequences can result in low PAPR sensing signal transmission.

Figure 6:
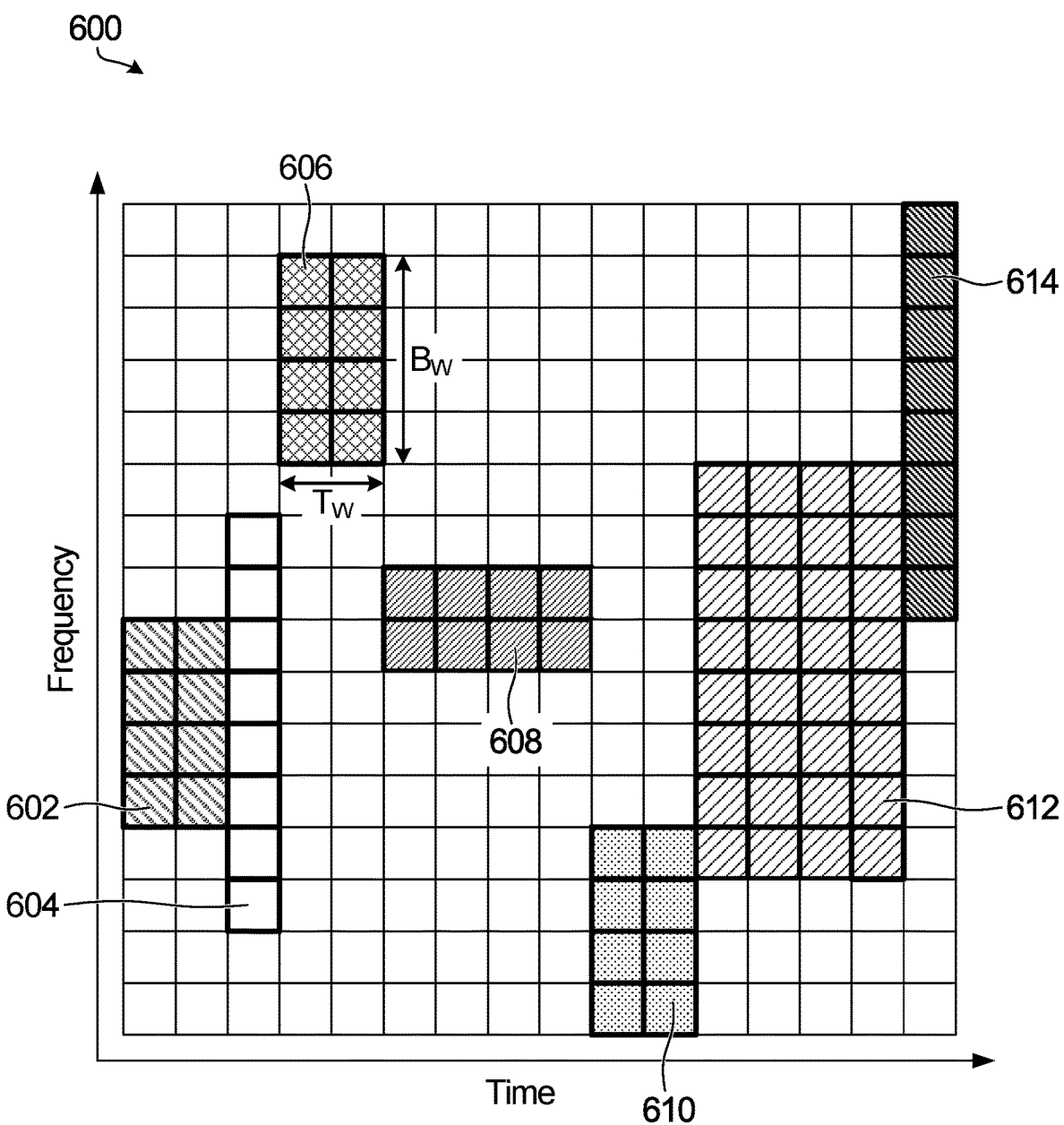
FIG. 6 is a block diagram illustrating a set of physical resources with multiple resource configurations for sensing signals according to aspects of the present disclosure.

FIG. 6 is a block diagram illustrating a set of physical resources 600 with multiple resource configurations 602, 604, 606, 608, 610, 612, 614 for sensing signals. In the illustrated example, the resource configurations 602, 604, 606, 608, 610, 612, 614 coexist in the set of physical resources 600 without any overlap of resources. As such, interference between the different sensing signals may be mitigated. The resource configurations 602, 604, 606, 608, 610, 612, 614 have various sparsity patterns. For example, the resource configuration 606 could be considered to be sparse in the time domain, whereas the resource configuration 608 could be considered to be sparse in the frequency domain. In some implementations, each of the resource configurations 602, 604, 606, 608, 610, 612, 614 is based on at least one of the sensing node ID, a desired sensing accuracy for the sensing signal, a predetermined beam direction for the sensing signal, and a desired peak-to-average power ratio for the sensing signal. The transmission time ($T_w$) and bandwidth (BW) of the resource configuration 606 is indicated in FIG. 6. The set of physical resources 600 and the resource configurations 602, 604, 606, 608, 610, 612, 614 could be considered to occupy a single operational frequency band.

In some embodiments, a sensing signal configuration includes a beam sweeping pattern that is associated with the sensing node ID of the associated sensing node. The beam sweeping pattern could also be referred to as a precoding design if it is realized by digital beamforming. In some implementations, the beam sweeping pattern is configured to perform sensing over a given region. In general, beam sweeping can be implemented by analog beamforming (through the use of phase shifters), digital beamforming (through precoding) or hybrid analog/digital beamforming.

A sensing node could include a transmitter having multiple radio frequency (RF) chains and/or multiple transmit antennas. The multiple transmit antennas could be used to perform beam sweeping and/or to provide sensing diversity and multiplexing through analog, digital or hybrid beamforming. A beam sweeping pattern, or another parameter of a sensing signal configuration, could include a mapping to at least some of the transmit antennas. For example, the sensing signal could be transmitted from multiple transmit antennas, potentially with different gains and phases applied to the sensing signal at each transmit antenna.

In some embodiments, a region of interest for a beam sweeping pattern can be characterized by $\theta \in [\theta_1, \theta_2]$, where $\theta$ is an angular direction, and $\theta_1, \theta_2$ are the angular boundaries of the region of interest. Beamforming can be used to target an angle-of-departure (AoD) within the region of interest. Depending on a desired resolution for the beam sweeping pattern (which can be configurable), an AoD vector can be defined as $\Theta=[\theta_1, \theta_1+\Delta\theta, \theta_1+2\Delta\theta, \ldots, \theta_2]$, where $\Delta\theta$ denotes the AoD step size. In some implementations, a beam sweeping pattern may perform incremental sweeping. For incremental sweeping, at each time slot t, $AoD(t)=\Theta(t)$.

In some implementations, weighted beam sweeping can be performed. In weighted beam sweeping, some directions are sensed or swept more than the others. Assuming the total number of beam sweeping time slots is equal to w, after w(t) time slots the sensing signals are transmitted over the AoD of $\Theta(t)$, where $w=\Sigma_t w(t)$. The weight vector for weighted beam sweeping can be defined in a sensing node-specific manner.

In some implementations, a beam sweeping pattern can be defined for certain requirements, such as interference reduction. In these implementations, $AoD(t)=\Theta(\Pi(t))$ for a permutation function $\Pi(.)$, where $\Pi(.)$ can be mapped to an associated sensing node ID. The permutation function for multiple sensing nodes can be defined in advance and preconfigured by the network to reduce interference between different sensing nodes. The permutation function can also be updated by the network in through semi-static signaling or dynamic signaling and communicated through RRC signaling, MAC-CE signaling, L1 signaling and/or X2/Xn signaling.

In communications, multiple antennas can be used to improve communication performance through increased diversity (for example, increased reliability), and/or through multiplexing gain (for example, increased data transmission rate). Similarly, multiple transmit antennas at sensing nodes can be used to improve sensing performance or quality. Depending on the number of transmit antennas and the signal processing capability of a sensing node, digital precoding can be used at the sensing node to provide sensing diversity. An orthogonal configuration for sensing signals can provide sensing diversity on the order of $N_T$, where $N_T$ denotes the number of transmit antennas. To achieve such an orthogonal configuration, a unitary precoding matrix could be applied on top of a sensing signal configuration to produce multiple sensing signals mapped to each digital antenna port. Any of a number of different unitary transformations can be used for this purpose. The unitary matrix could be a fixed universal unitary precoding, or the unitary matrix could be sensing node-specific. Since the number of transmit antennas can vary between different sensing nodes, the dimension of the unitary matrix may vary. As such, a scalable unitary precoding may be preferable to provide savings in signaling, for example. In some implementations, a Walsh-Hadamard transformation can be used as a scalable unitary precoding. In some embodiments, transmit antennas at a sensing node can be grouped in multiple sets, and a unitary precoding can be applied to the antennas within a set. A phase rotation can then be applied to the different sets for the purpose of beam steering.

After determining a sensing signal configuration, at least a portion of the sensing signal configuration could be communicated between network entities. Transmitting at least a portion of a sensing signal configuration can include transmitting signaling with one or more indicator(s) that explicitly or implicitly convey the sensing signal parameters. Potential benefits of communicating sensing signal configurations between network entities include interference management between sensing signals sent by different sensing nodes, reducing the impact of sensing signals on communications, and reducing the impact of communication signals on sensing. For example, a sensing node could transmit at least a portion of a sensing signal configuration to another sensing node. This sensing signal configuration could be used by either sensing node to transmit a sensing signal. The sensing node that does not use the sensing signal configuration to transmit a sensing signal could still use the sensing signal configuration to at least partially avoid interference with the sensing signal.

In some embodiments, parameters of a sensing signal configuration are signaled between base stations, between UEs, and/or between base stations and UEs. These parameters may include, but are not limited to:
- a symbol sequence;
- a resource configuration;
- a beam sweeping pattern; and
- a precoding matrix.

A sensing signal configuration could be determined by a sensing node in any of a number of different ways. For example, the sensing signal configuration could be generated by the sensing node, and/or configured for the sensing node by another network entity. In some embodiments, there is an explicit indication of a sensing signal configuration assigned to a particular sensing node. The network could explicitly signal all possible sensing signal configurations, which could then be stored in a look-up table. The look-up table could include any or all combinations of sensing signals with different symbol sequence lengths, sparsity patterns, time/frequency resolutions, and beam sweeping patterns, for example. A mapping function could be used to input a sensing node ID, a beam sweeping pattern and/or parameters related to a desired sensing performance, and return a sensing signal index that can be used to locate a sensing signal configuration in the look-up table. In some implementations, a sensing node could use the mapping function to determine a sensing signal index, and use the index to locate a sensing signal configuration in the look-up table. In other implementations, a sensing node can receive an index from another network entity and use the index to locate a sensing signal configuration in the look-up table.

In cases with a large number of possible sensing signal configurations, a look-up table may be difficult or impractical to implement and store. Therefore, in some embodiments, a generic formula could be used to determine or generate a sensing signal configuration for a sensing node. In some implementations, the formula inputs a sensing node ID, a beam sweeping pattern and/or parameters related to a desired sensing performance, and generates a sensing signal configuration. Such a formula could be known to any or all sensing nodes and/or network entities in a network. Therefore, each sensing node could generate the same sensing signal configuration from the same input parameters. In some implementations, the coefficients of a formula for sensing signal configurations are signaled to network entities through higher layer signaling.

In some embodiments, a seed value can be generated based on a given sensing node ID (SeID), which can also depend on other parameters such as slot index, symbol index and beam index. An example is provided below:

$$c_{init}=2^M \cdot \lfloor SeID/2^m \rfloor + 2^K \cdot (a_s n_s + a_l l + a_b b + k)(2 \cdot (SeID \bmod 2^m)+1)+2 \cdot (SeID \bmod 2^m) \quad \text{(Equation 3)}$$

In equation 3, $c_{init}$ is the initialization seed, $n_s$, l, b denote the slot index, symbol index and beam index, respectively, and the coefficients $a_s$, $a_l$, $a_b$ are indicative of how the seed value is related to $n_s$, l, b. For instance, if $a_s$=0, then the seed does not depend on the slot index. The value of SeID is chosen from the set $\{0, 1, \ldots, N_{seed}\}$, and K, m, k are design parameters that can be chosen to provide suitable performance (for example, in terms of the required randomization level). In some embodiments, $N_{seed}=2^N-1$ for some value of N.

Once the seed is determined, the actual symbols in the symbol sequence can be determined by setting one or more parameters of the sequence according to the seed. For example, if Pseudo-random sequences are defined by a length-p binary Gold sequence, the output sequence c(n) of length $N_{PN}$ can be written as:

$$c(n)=(x_1(n+N_C)+x_2(n+N_C)) \bmod 2 \quad \text{(Equation 4)}$$

$$x_1(n+p)=(x_1(n)+\Sigma_{i \in S_{1,p}} x_1(n+i)) \bmod 2 \quad \text{(Equation 5)}$$

$$x_2(n+p)=(x_2(n)+\Sigma_{i \in S_{2,p}} x_2(n+i)) \bmod 2 \quad \text{(Equation 6)}$$

In equations 4, 5 and 6, $S_{1,p}$ and $S_{2,p}$ denote a subset of indices from 1 to p−1 and $N_C$ is the design parameter. In some embodiments, the first sequence $x_1(n)$ can be initialized as $x_1(0)=1$ and $x_1(n)=0$, n=1, . . . , p−1. The second sequence $x_2(n)$, n=0, . . . , p−1 can be initialized based on the seed value $c_{init}$ as the results of the binary expansion of $(c_{init} \bmod 2^p)$ as $\Sigma_{i=0}^{p-1} x_2(i) 2^i$. An example can be given as p=31, $N_C$=1600, $S_{1,p}=\{3\}$, $S_{2,p}=\{1,2,3\}$.

In yet another illustrative example, the symbol sequence can be ZC sequence of length $N_{ZC}$ given as below:

$$c(n) = \exp\left(-j \frac{\pi u n(n' + c_f + 2q)}{N_{ZC}}\right), \quad \text{(Equation 7)}$$
$$n = 0, \ldots, N_{ZC} - 1$$

In equation 7, u is the sequence root (which is prime to N), $n'=(n+C_s) \bmod N_{zc}$ in which $C_s \in \{0, \ldots, N_{ZC}-1\}$ denotes the value of the cyclic shift, $c_f = N_{ZC} \bmod 2$, and q is an integer. In some embodiments, $C_s$ can be mapped to the seed as $C_s = C_{init} \bmod N_{ZC}$. Also, the sequence root u can be mapped to the seed as u=prime($c_{init} \bmod N_{ZC}$) where prime(x) denotes the largest prime number which is less than or equal to x.

In some embodiments, a sensing node is a TRP, and a sensing node ID and/or a sensing signal configuration for the TRP is transmitted from the TRP to other network entities, or is received by the TRP from other network entities. For example, the sensing signal configuration could be signaled to/from other network nodes (including neighboring TRPs, SAs, etc.) through X2/Xn signaling. The X2/Xn is the interconnecting interface between two eNodeBs in a network and supports both the Control Plane and the User Plane. The sensing signal configuration could also or instead be signaled to one or more UEs through L1 signaling and/or through higher layer signaling, such as RRC and MAC CE signaling. The L1 is the physical layer. The sensing signal configuration could be signaled in an explicit manner or implicit manner. The signaling to the UEs may be implicit in the sense that the full sensing signal configuration might not be communicated, but could include some indications as to which resources (in time, frequency, space or code, for example) the UEs should avoid for transmission in order to mitigate interference with the sensing signal. The signaling could also include power control parameters. Furthermore, the signaling to the UEs could include sensing signal configuration parameters for neighboring sensing nodes that are received through X2/Xn signaling. In some implementations, signaling from a TRP is used to assign a UE as a sensing node. Such signaling could include a sensing node ID for the UE, as well as at least a portion of a sensing signal configuration.

In some embodiments, a sensing node is a UE, and a sensing node ID and/or a sensing signal configuration for the UE is transmitted from the UE to other network entities, or is received by the UE from other network entities. For example, a sensing node ID for the UE could be signaled to the UE from a network node through L1 signaling or through higher layer signaling, such as RRC and MAC CE signaling. In some implementations, the sensing node ID is assigned and/or pre-configured to the UE (for example, through higher layer signaling), and an indication that the UE should act as a sensing node is signaled by the network through L1 signaling. An example of such an indication could be referred to as SeN_enable. The signaling to the UE could also include parameters of a sensing signal configuration, including a beam sweeping pattern, a resource configuration, a symbol sequence, one or more indicators (explicit and/or implicit) of a desired sensing quality, and/or one or more indicators of the environment (for example, target classification results based on previous measurements), for example. Once a sensing signal configuration is determined by the UE, the sensing signal configuration can be signaled to other network entities explicitly or implicitly. These other network entities include neighboring TRPs and SAs, for example. The signaling to the network entities might only include the parameters that are ambiguous to the network entities, as some parameters might have already been transmitted from the network to the UE for determining the sensing signal configuration. The sensing signal configuration can also or instead be signaled to other UEs through L1 signaling and/or higher layer signaling, for example. The signaling to the UEs may be implicit in the sense that the full sensing signal configuration might not be communicated, but could include some indications about which resources (in time, frequency, space or code, for example) the UEs should avoid for transmission in order to mitigate interference.

Examples of configuring and implementing sensing signals in a wireless communication network will now be described with reference to FIGS. 7 and 8.

Figure 7:
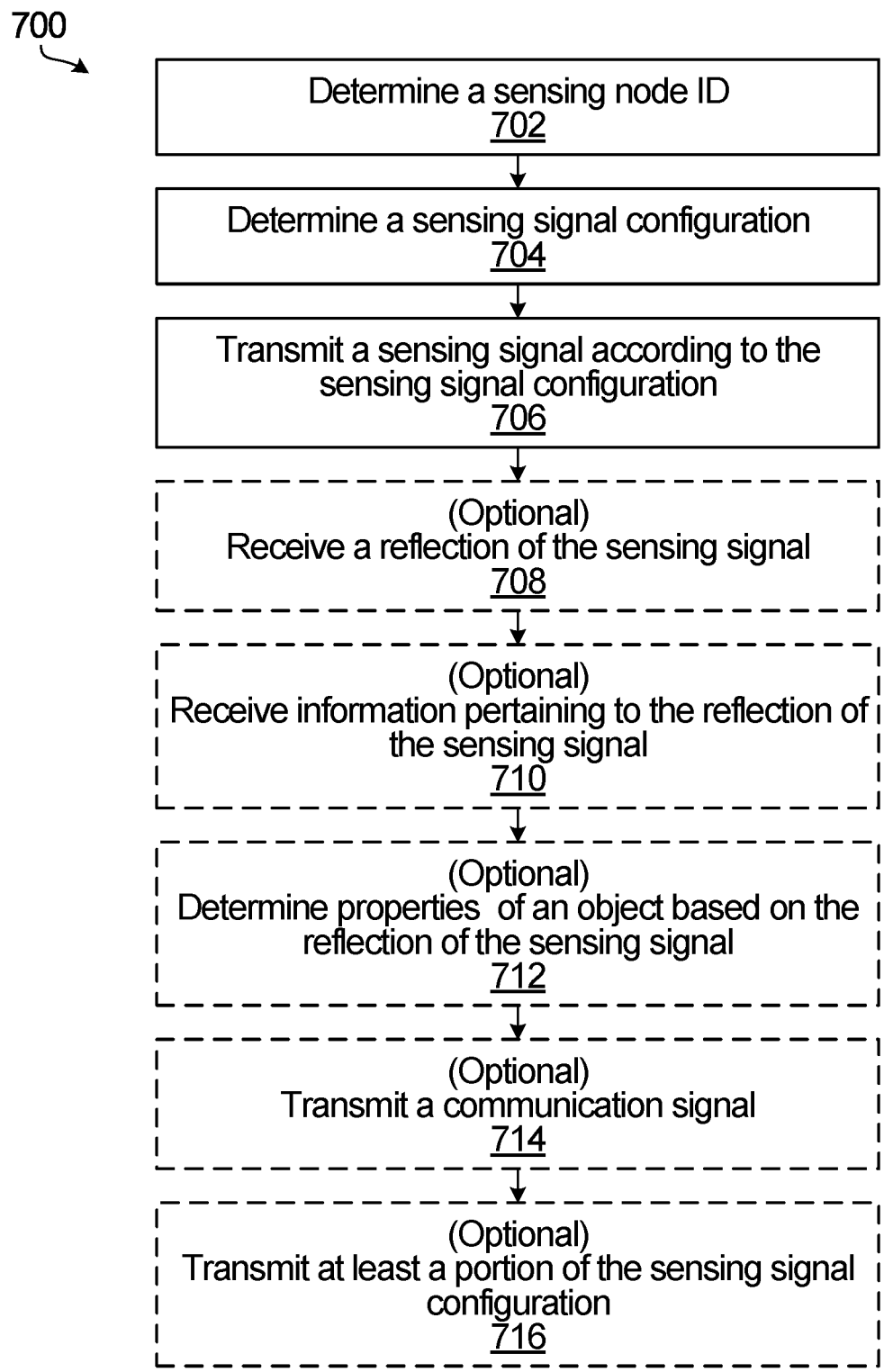
FIGS. 7 and 8 are flow diagrams illustrating methods according to embodiments of the present disclosure.

FIG. 7 is a flow diagram illustrating a method 700 according to an embodiment of the present disclosure. The method 700 is performed by a network entity in a wireless communication network, which could be a UE, a base station, or a SA, for example. The method 700 includes multiple steps 702, 704, 706, 708, 710, 712, 714, 716.

Step 702 includes determining a sensing node ID that is associated with the network entity, and step 704 includes determining a sensing signal configuration or sensing signal configuration information. The sensing signal configuration includes a resource configuration that is selected from a set of physical resources associated with the wireless communication network, and a symbol sequence that is based on the sensing node ID and is specific to the network entity in the wireless communication network. As such, the sensing node ID could be used to determine the sensing signal configuration.

As discussed in detail above, the "determining" operations in steps 702, 704 could include the network entity being configured with the sensing node ID and/or the sensing signal configuration. For example, the network entity could receive signaling that includes one or more indications (implicit or explicit) of the sensing node ID and/or the sensing signal configuration. Also or instead, the "determining" operations in steps 702, 704 could include the network entity generating the sensing node ID and/or the sensing signal configuration. For example, the network entity could generate the sensing node ID and/or the sensing signal configuration using one of more of: preconfigured rules or parameters, look-up tables, desired sensing accuracy and formulae, for example.

In some implementations, the resource configuration includes a sparsity pattern in at least one of the frequency domain and the time domain. Such a sparsity pattern could be based on at least one of the sensing node ID, a desired sensing accuracy for the sensing signal, a predetermined beam direction for the sensing signal, and a desired PAPR for the sensing signal, for example.

In some implementations, the symbol sequence is or includes a Zadoff-Chu sequence. For example, step 704 could include generating the Zadoff-Chu sequence using the sensing node ID a root of the Zadoff-Chu sequence and/or a phase shift value of the Zadoff-Chu sequence.

In some implementations, the symbol sequence is or includes a binary PN sequence. For example, step 704 could include generating the PN sequence using the sensing node ID, the sensing node ID being associated with at least one of a polynomial of the PN sequence, a degree of the PN sequence, and a type of the PN sequence. In some implementations, the sensing node ID is associated with generating the polynomial and/or the degree for a given sequence type.

Step 706 includes transmitting a sensing signal according to the sensing signal configuration. Optionally, the sensing signal is an OFDM signal. For example, the sensing signal configuration could include an OFDM waveform configuration.

In some implementations, the sensing signal configuration also includes a beam sweeping pattern associated with the sensing node ID, and possibly includes a precoding matrix. The beam sweeping pattern could define multiple beam directions to perform sensing over a predetermined area around the network entity, and the precoding matrix could be applied on top of the sensing signal configuration to produce multiple sensing signals mapped to multiple transmit antennas. Accordingly, the method 700 could include transmitting multiple sensing signals, including the sensing signal transmitted at step 706, according to the beam sweeping pattern. In some implementations, transmitting the plurality of sensing signals comprises performing analog beamforming, digital beamforming or hybrid beamforming. Optionally, the resource configuration and/or the symbol sequence determined in step 704 is/are based on a predetermined beam direction for the sensing signal in order to distinguish different sensing signals that are transmitted in different directions.

Step 708 is an optional step that includes receiving a reflection of the sensing signal. In this case, since the network entity transmits and receives the sensing signal, the network entity is performing mono-static sensing. In addition to or instead of step 708, the network entity could receive information pertaining to the reflection of the sensing signal from another network entity in the wireless communication network in optional step 710. Step 710 is an example of bistatic sensing.

Following step 708 and/or step 710, the network entity could determine properties of an object based on a reflection of the sensing signal in optional step 712. This object could be a UE or a scattering object, for example. The scattering object could at least partially obstruct communication signals by scattering, reflecting and/or absorbing the communication signals, for example. The properties of the object could include the range, shape, location, speed and/or velocity of the object, for example.

The information pertaining to the reflection of the sensing signal received at step 710 could include the properties of the object. The information pertaining to the reflection of the sensing signal could also or instead include the time-of-flight of the sensing signal and/or the Doppler shift of the reflection of the sensing signal and/or the angle of arrival of the reflection of the sensing signal, in order to allow the network entity to determine the properties.

Optional step 714 includes transmitting a communication signal. In some implementations, the communication signal is configured based on the properties of the object. In one example, the object referred to above is a UE, and a location of the UE could be determined at step 712 and used to configure narrow beamforming of the communication signal to the UE. In another example, the object referred to above is a scattering object, and a location of the scattering object could be determined at step 712 and used to configure narrow beamforming of the communication signal to avoid the scattering object.

In some implementations, the communication signal is transmitted using a resource configuration selected from the same set of resources as the resource configuration for the sensing signal (for example, in-band sensing). In other implementations, the communication signal is transmitted using a resource configuration selected from a different set of resources as the resource configuration for the sensing signal (for example, out-of-band sensing). In any of these implementations, the sensing signal could have a same frame structure and/or a same numerology as the communication signal, and/or a different frame structure and/or a different numerology than the communication signal.

Step 714 is an optional step that includes transmitting, to another network entity in the wireless communication network, at least a portion of the sensing signal configuration. The transmission could use L1 signaling, RRC signaling or X2/Xn signaling, for example. The other network entity could be a UE, base station or SA, and could use the sensing signal configuration to avoid interference with the sensing signal.

A network entity preforming the method 700 could include at least a processor and transmitter. The processor is to determine a sensing node ID associated with the network entity and determine a sensing signal configuration. The transmitter is to transmit a sensing signal according to the sensing signal configuration. Examples of processors and transmitters are discussed in detail above with reference to FIGS. 2A, 2B and 2C. In some implementations, the transmitter includes multiple transmit antennas, and the sensing signal configuration includes a mapping (for example, a precoding matrix) to at least some of the transmit antennas.

Figure 8:
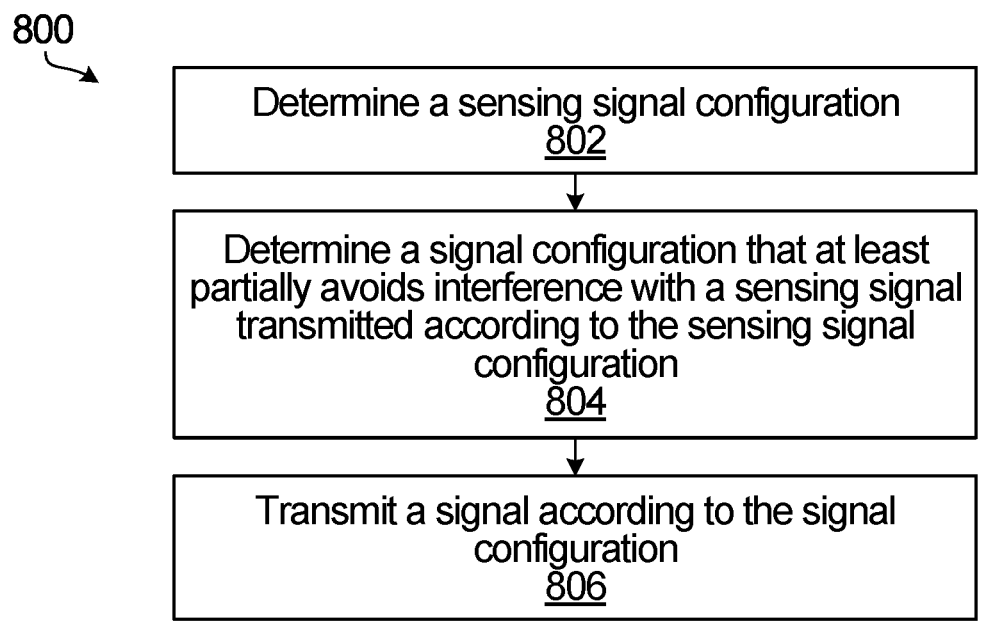

FIG. 8 is a flow chart illustrating a method 800 according to another embodiment of the present disclosure. The method 800 is performed by a first network entity in a wireless communication network, and is an example of a method for configuring a signal (sensing or communication) that at least partially avoids interference with a sensing signal transmitted from a second network entity. The method 800 includes multiple steps 802, 804, 806.

Step 802 includes determining a sensing signal configuration for the second network entity in the wireless communication network. The sensing signal configuration includes at least a resource configuration that is selected from a set of physical resources associated with the wireless communication network. Optionally, the sensing signal configuration includes a symbol sequence that is based on a sensing node ID of the second network entity and is specific to the second network entity in the wireless communication network. Determining the sensing signal configuration could include receiving, from the second network entity, an indication of at least a portion of the sensing signal configuration. Determining the sensing signal configuration could also or instead include generating or calculating at least a portion of the sensing signal configuration based on a sensing node ID of the second network entity and/or on the sensing requirements for the second network entity.

Step 804 includes determining, based on the sensing signal configuration, a signal configuration that at least partially avoids interference with a sensing signal transmitted according to the sensing signal configuration by the second network entity. Step 806 then includes transmitting a signal according to the signal configuration. The signal could be a communication signal or another sensing signal.

Similar to steps 702, 704 of FIG. 7, the "determining" operation in step 804 could include the first network entity receiving signaling that configures the signal configuration. Also or instead, the "determining" operation in step 804 could include the first network entity generating the signal configuration using one of more of: preconfigured rules or parameters, look-up tables, desired sensing accuracy and formulae, for example.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for a network entity in a wireless communication network, the method comprising:
   determining, by the network entity, a sensing node identifier (ID);
   determining, by the network entity, a sensing signal configuration, the sensing signal configuration including:

a resource configuration that specifies physical resources selected from a set of physical resources associated with the wireless communication network; and a symbol sequence;

wherein the determining the sensing signal configuration includes:

generating an initialization seed based on the sensing node ID; and using the initialization seed to generate the symbol sequence; and transmitting or receiving, by the network entity, a sensing signal according to the sensing signal configuration.

2. The method of claim 1, further comprising:
determining, by the network entity, properties of an object based on a reflection of the sensing signal.

3. The method of claim 2, further comprising:
receiving, by the network entity, the reflection of the sensing signal.

4. The method of claim 2, further comprising:
receiving, by the network entity from another network entity in the wireless communication network, information pertaining to the reflection of the sensing signal, wherein determining the properties of the object is based on the information pertaining to the reflection of the sensing signal.

5. The method of claim 2, wherein the object comprises at least one of a user equipment (UE) and a scattering object that at least partially obstructs communication signals.

6. The method of claim 2, further comprising:
transmitting, by the network entity, a communication signal comprising data, the communication signal being configured based on the properties of the object.

7. The method of claim 1, further comprising:
transmitting, by the network entity, using at least some of the set of physical resources, a communication signal comprising data.

8. The method of claim 7, wherein the sensing signal has a same frame structure and a same numerology as the communication signal.

9. The method of claim 7, wherein the sensing signal has a different frame structure than the communication signal and a same numerology as the communication signal.

10. The method of claim 1, wherein the set of physical resources is a first set of physical resources, the method further comprising:
transmitting, by the network entity, using at least some of a second set of physical resources associated with the wireless communication network, a communication signal comprising data, the second set of physical resources being different from the first set of physical resources.

11. The method of claim 1, wherein the sensing signal is an orthogonal frequency division multiplexing (OFDM) signal.

12. The method of claim 1, wherein the symbol sequence is further based on a predetermined beam direction for the sensing signal.

13. The method of claim 1, wherein the resource configuration comprises a sparsity pattern in at least one of frequency domain and time domain.

14. The method of claim 13, wherein the sparsity pattern is based on at least one of the sensing node ID, a desired sensing accuracy for the sensing signal, a predetermined beam direction for the sensing signal, and a desired peak-to-average power ratio for the sensing signal.

15. The method of claim 1, wherein the sensing signal configuration further comprises a beam sweeping pattern associated with the sensing node ID, the method further comprising:
transmitting, by the network entity, a plurality of sensing signals, including the sensing signal, according to the beam sweeping pattern.

16. The method of claim 15, wherein transmitting the plurality of sensing signals comprises performing analog beamforming, digital beamforming or hybrid beamforming.

17. The method of claim 1, further comprising:
transmitting, by the network entity to another network entity in the wireless communication network, at least a portion of the sensing signal configuration.

18. The method of claim 1, wherein the network entity is a user equipment, a base station, or a sensing agent.

19. The method of claim 1, wherein transmitting the sensing signal according to the sensing signal configuration comprises transmitting the symbol sequence using resources specified in the resource configuration.

20. The method of claim 1, wherein the generating the initialization seed: is further based on at least one of: slot index; symbol index; and beam index.

21. The method of claim 1, wherein the sensing node is part of the network entity.

22. The method of claim 1, wherein the sensing node is a separate node not embedded into the network entity.

23. The method of claim 1, wherein the symbol sequence comprises a Zadoff—Chu sequence and wherein the determining the sensing signal configuration comprises generating the Zadoff—Chu sequence using the sensing node ID as at least one of a root of the Zadoff—Chu sequence and a phase shift value of the Zadoff—Chu sequence.

24. The method of claim 1, wherein the symbol sequence comprises a Pseudo Noise (PN) sequence and wherein the determining the sensing signal configuration comprises generating the PN sequence using the sensing node ID, the sensing node ID being associated with at least one of a polynomial of the PN sequence, a degree of the PN sequence and a type of the PN sequence.

25. A network entity in a wireless communication network, the network entity comprising:
a processor to:
determine a sensing node identifier (ID); and
determine a sensing signal configuration, the sensing signal configuration including:
a resource configuration that specifies physical resources selected from a set of physical resources associated with the wireless communication network; and
a symbol sequence;
wherein the processor is configured to determine the sensing signal configuration by:
generating an initialization seed based on the sensing node ID; and
using the initialization seed to generate the symbol sequence; and a transmitter to transmit a sensing signal according to the sensing signal configuration; or a receiver to receive a sensing signal according to the sensing signal configuration.

26. The network entity of claim 25, wherein the transmitter comprises a plurality of transmit antennas, and wherein the sensing signal configuration further comprises a mapping to at least some of the plurality of transmit antennas.

27. The network entity of claim 25, wherein the symbol sequence comprises the Zadoff—Chu sequence, and wherein the processor determines the sensing signal configuration by generating the Zadoff—Chu sequence using the sensing node ID as at least one of a root of the Zadoff—Chu sequence and a phase shift value of the Zadoff—Chu sequence.

28. The network entity of claim 25, wherein the symbol sequence comprises the Pseudo Noise (PN) sequence, and wherein the processor determines the sensing signal configuration by generating the PN sequence using the sensing node ID, the sensing node ID being associated with at least one of a polynomial of the PN sequence, a degree of the PN sequence, and a type of the PN sequence.

29. The network entity of claim 25, wherein the processor is further configured to generate the initialization seed based on at least one of:
 a slot index;
 a symbol index; and
 a beam index.

30. The network entity of claim 25, further comprising determining symbols in the symbol sequence by setting, according to the initialization seed, one or more parameters of the sequence.

31. The network entity of claim 25, wherein the sensing node is part of the network entity.

32. The network entity of claim 25, wherein the sensing node is a separate node not embedded into the network entity.

33. A method for a first network entity in a wireless communication network, the method comprising:

determining, by the first network entity, a second network entity sensing signal configuration for a second network entity in the wireless communication network, the second network entity sensing signal configuration including:
 a resource configuration that specifies physical resources selected from a set of physical resources associated with the wireless communication network; and
 a symbol sequence that is based on a sensing node identifier (ID) of the second network entity, wherein the sensing node ID of the second network entity is distinct from other identifiers associated with the second network entity;
determining, by the first network entity based on the second network entity sensing signal configuration, a data communication signal configuration that at least partially avoids interference with a sensing signal that is to be transmitted by the second network entity in accordance with the second network entity sensing signal configuration; and
transmitting, by the first network entity, a communication signal according to the data communication signal configuration, the communication signal comprising data.

34. The method of claim 33, wherein determining the second network entity sensing signal configuration comprises:
 receiving, from the second network entity, an indication of at least a portion of the second network entity sensing signal configuration.

\* \* \* \* \*